US012558778B2

(12) United States Patent (10) Patent No.: US 12,558,778 B2
Atherton et al. (45) Date of Patent: Feb. 24, 2026

(54) CONFIGURING A ROBOTIC CAMERA TO MIMIC CINEMATOGRAPHIC STYLES

(71) Applicant: Autodesk, Inc., San Francisco, CA (US)

(72) Inventors: Evan Patrick Atherton, Foster City, CA (US); David Thomasson, Fairfax, CA (US); Heather Kerrick, Oakland, CA (US); Maurice Ugo Conti, Muir Beach, CA (US)

(73) Assignee: AUTODESK, INC., San Francisco, CA (US)

( * ) Notice: Subject to any disclaimer, the term of this patent is extended or adjusted under 35 U.S.C. 154(b) by 1516 days.

(21) Appl. No.: 15/258,957

(22) Filed: Sep. 7, 2016

(65) Prior Publication Data

US 2018/0065247 A1 Mar. 8, 2018

(51) Int. Cl.
B25J 9/16 (2006.01)
G05B 19/042 (2006.01)

(52) U.S. Cl.
CPC ............ B25J 9/163 (2013.01); G05B 19/042 (2013.01); *G05B 2219/40264* (2013.01); *G05B 2219/40391* (2013.01)

(58) Field of Classification Search
CPC .... G06N 3/02; G06N 3/08–088; G06N 20/00; G05B 13/00; G05B 13/0265–0295; G05B 19/042; G05B 2219/40264; G05B 2219/40391; B25J 9/163

USPC ...................... 706/15, 16, 23, 25; 700/47–49
See application file for complete search history.

(56) References Cited

U.S. PATENT DOCUMENTS

| | | | | |
|---|---|---|---|---|
| 2002/0196327 A1* | 12/2002 | Rui | ......................... | H04N 7/181 |
| | | | | 348/14.11 |
| 2011/0267481 A1* | 11/2011 | Kagei | ...................... | G03B 3/10 |
| | | | | 348/211.9 |
| 2016/0277673 A1* | 9/2016 | Carr | ..................... | H04N 5/2228 |
| 2017/0201714 A1* | 7/2017 | Kim | ........................ | H04N 5/911 |
| 2019/0087734 A1* | 3/2019 | Ide | .......................... | G06V 40/20 |

OTHER PUBLICATIONS

Lima et al. "Support Vector Machines for Cinematography Real-Time Camera Control in Storytelling Environments", 2009, 2009 VIII Brazilian Symposium on Games and Digital Entertainment.*
Lima et al. "Virtual Cinematography Director for Interactive Storytelling", 2009, ACE '09: International Conference in Advances in Computer Entertainment Technology.*
Okuda et al. "Machine Learning of Shooting Technique for Controlling a Robot Camera", 2009, 2009 IEEE International Conference on Robotics and Biomimetics (ROBIO).*

(Continued)

*Primary Examiner* — Markus A. Vasquez
(74) *Attorney, Agent, or Firm* — Artegis Law Group, LLP

(57) ABSTRACT

A control engine is trained to operate a robotic camera according to a variety of different cinematographic techniques. The control engine may reconfigure the robotic camera to respond to a set of cues, to enforce a set of constraints, or to apply one or more characteristic styles. A training engine trains a network within the control engine based on training data that exemplifies cue responses, enforced constraints, and characteristic styles.

21 Claims, 11 Drawing Sheets

(56) References Cited

OTHER PUBLICATIONS

Carr et al. "Hybrid Robotic/Virtual Pan-Tilt-Zoom Cameras for Autonomous Event Recording", 2013, MM '13: ACM Multimedia Conference.*

Tsuda et al. "A High-Accuracy Image Composition System Using a Mobile Robotic Camera", Mar. 2008, SMPTE Motion Imaging Journal.*

Merabti et al. "A virtual Director Inspired by Real Directors", 2014, AAAI-14 Workshop.*

Xueting Wang, Takatsugu Hirayama, Kenji Mase, "Viewpoint Sequence Recommendation Based on Contextual Information for Multiview Video", IEEE Multimedia, vol. 22, No. 4, pp. 40-50, Oct.-Dec. 2015. (Year: 2015).*

* cited by examiner

800

| RECEIVE CONTROL DATA | 802 |

↓

| PROCESS CONTROL DATA VIA NETWORK TO GENERATE OUTPUT | 804 |

↓

| TRANSLATE OUTPUT VIA COMMAND TRANSLATOR TO GENERATE CONTROL SIGNALS | 806 |

↓

| OUTPUT CONTROL SIGNALS TO ROBOT TO CAUSE ROBOT TO RESPOND TO CUES, ENFORCE CONSTRAINTS, AND/OR MIMIC STYLES WHEN CAPTURING MULTIMEDIA DATA | 808 |

CONFIGURING A ROBOTIC CAMERA TO MIMIC CINEMATOGRAPHIC STYLES

BACKGROUND OF THE INVENTION

Field of the Invention

Embodiments of the present invention relate generally to robotics and, more specifically, to configuring a robotic camera to mimic cinematographic styles.

Description of the Related Art

A director of movies typically draws inspiration from a wide variety of artistic sources in order to develop a personal style. When filming a movie, the director makes various filming decisions based on his/her personal style. For example, a director could draw inspiration from the work of another director who characteristically uses a wide-angle lens to shoot landscape scenes and then decide to employ a similar technique when shooting a particular landscape scene. When filming a particular scene, a director typically communicates instructions to one or more camera operators that indicate the various filming decisions needed for that scene. In doing so, the director instructs the camera operator(s) with respect to framing particular shots, panning and zooming, and performing other cinematographic operations based on, and in response to, the scene being filmed.

One problem with this conventional approach is that the director may have difficulty translating filming decisions into specific instructions that can be easily communicated to a camera operator. Another problem is that the camera operator may have difficulty precisely performing those instructions.

As the foregoing illustrates, what is needed in the art is a more effective approach to operating a camera in the way envisioned by a director.

SUMMARY OF THE INVENTION

Various embodiments of the present invention set forth a computer-implemented method for controlling a robot, including receiving control data indicating a first technique to execute when capturing sensor data, configuring a network to generate a set of commands based on the control data, and causing a robotic camera to execute the first technique, based on the set of commands, to capture the sensor data.

At least one advantage of the techniques described herein is that a director of a movie can provide examples of cinematographic operations, and a control engine then causes the robot to mimic those operations.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
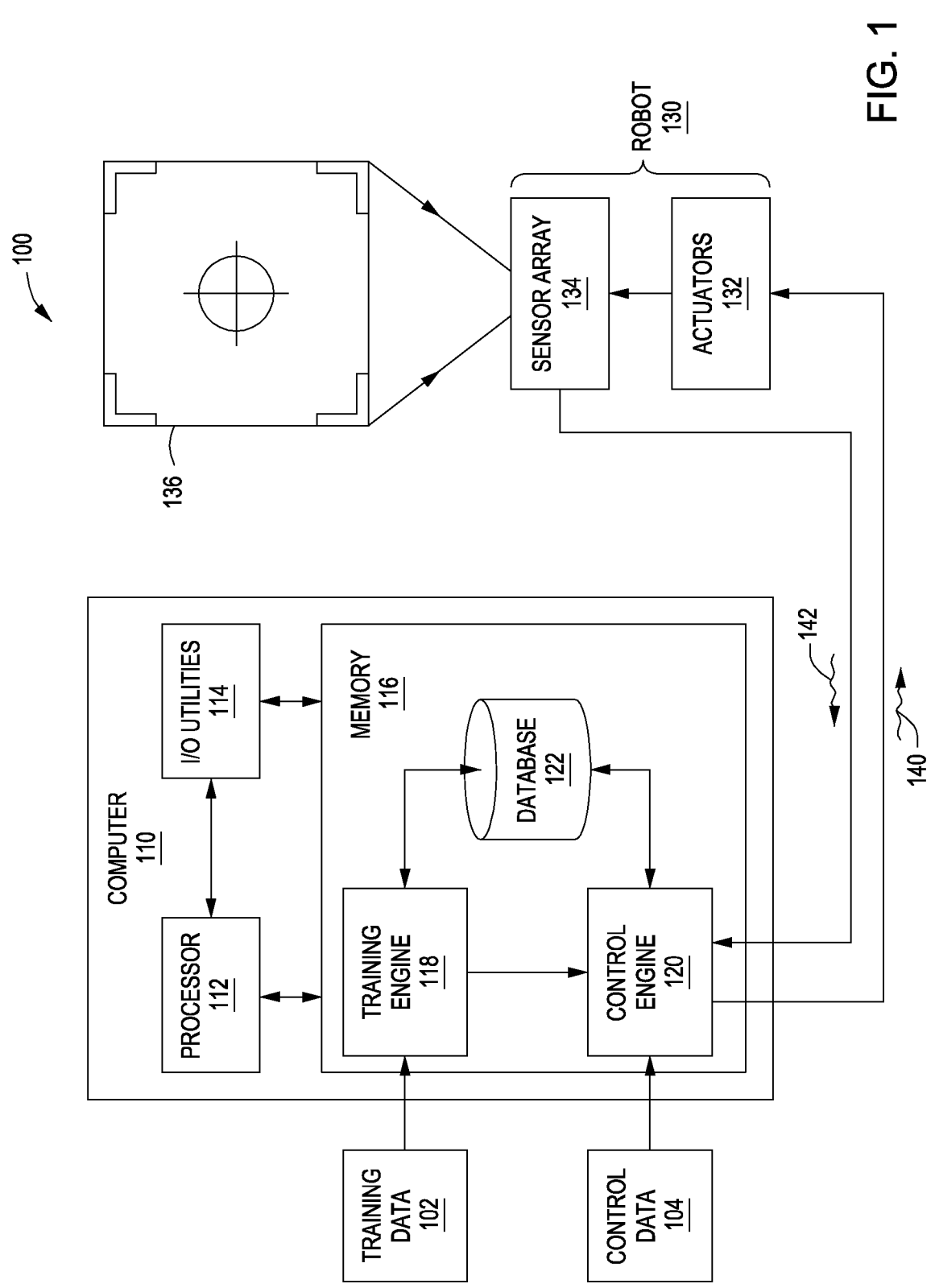
FIG. 1 illustrates a system configured to implement one or more aspects of the present invention.

FIG. 1 illustrates a system configured to implement one or more aspects of the present invention. As shown, system 100 includes a computer 110 coupled to a robot 130.

Computer 110 includes a processor 112, input/output (I/O) utilities 114, and a memory 116, coupled together. Processor 112 may be any technically feasible form of processing device configured process data and execute program code. Processor 112 could be, for example, a central processing unit (CPU), a graphics processing unit (GPU), an application-specific integrated circuit (ASIC), a field-programmable gate array (FPGA), any technically feasible combination of such units, and so forth. I/O utilities 114 may include devices configured to receive input, including, for example, a keyboard, a mouse, and so forth. I/O utilities 114 may also include devices configured to provide output, including, for example, a display device, a speaker, and so forth. I/O utilities 114 may further include devices configured to both receive and provide input and output, respectively, including, for example, a touchscreen, a universal serial bus (USB) port, and so forth.

Memory 116 may be any technically feasible storage medium configured to store data and software applications. Memory 116 could be, for example, a hard disk, a random access memory (RAM) module, a read-only memory (ROM), and so forth. Memory 116 includes a training engine 118, a control engine 120, and a database 122. Training engine 118 is a software application that, when executed by processor 112, trains control engine 120 based on received training data 102. Control engine 120 is a software application that, when executed by processor 112, controls robot 130 based on control data 104.

Robot 130 includes actuators 132 coupled to a sensor array 134. Robot 130 may be any technically feasible type of robot, including a robotic arm, an autonomous drone, a walking robot, a humanoid robot, and so forth. Actuators 132 may be any type of mechanism configured to induce physical motion, including linear or rotational motors, hydraulic or pneumatic pumps, and so forth. Sensor array 134 may include any technically feasible collection of sensors. For example, sensor array 134 could include an optical sensor, a sonic sensor, and/or other types of sensors configured to measure physical quantities. Generally, sensor array 134 is configured to record multimedia data. In practice, sensor array 134 includes a video camera configured to capture a frame 136. By capturing a sequence of such frames, sensor array 134 may record a movie.

In operation, training engine 118 trains control engine 120 based on training data 102 prior to operation of robot 130. Training data 102 may include a wide variety of different types of data that, generally, indicate particular filming styles and/or cinematographic techniques that may be implemented when filming a movie. Training data 102 may specifically include individual movies, movie sequences, sequences with tagged features, exemplary camera dynamics, and so forth.

Once trained based on training data 102, control engine 120 may receive control data 104 that generally indicates how a scene should be filmed. For example, control data 104 may select a particular cinematographic operation, previously trained via training engine 118, to implement in the context of a given scene. Alternatively, control data 104 could select a subset of cinematographic styles included in a larger set of cinematographic styles trained via training engine 118. A director or another human operator of system 100 may provide control data 104 to control engine 120. Based on this data, control engine 120 instructs robot 130, via control signals 140, to perform specific cinematographic operations derived from training data 102 and reflective of control data 104.

When performing these cinematographic operations, robot 130 captures sensor data 142 via sensor array 134 and transmits the sensor data back to control engine 120. Control engine 120 may process sensor data 142 in order to inform the generation of future control signals 142. Persons skilled in the art will recognize that sensor data 142 completes a feedback path to control engine 120, allowing control engine 120 to generate control signals 140 based on this feedback. Control engine 120 may also store multimedia data generated based on that sensor data into database 122. In this fashion, control engine 120 can be trained to film a movie, via robot 130, in a manner that may be stylistically similar to some or all of the movies included in training data 102.

As an example of the above technique, suppose training data 102 includes a movie directed by a director who employs a particular technique for framing close-up shots. Training engine 118 could train control engine 120 to mimic this technique. Then, during filming of a movie, the director of the movie could instruct control engine 120, via control data 104, to implement the technique when filming. Control engine 120 would then issue control signals 140 to robot 130 to cause robot 130 to frame close-up shots using the aforementioned technique. Robot 130 would then record sensor data 142 and transmit that data back to control engine 120. Control engine 120 could process sensor data 142 in order to continue framing close-up shots according to the prescribed technique, and also store multimedia data derived from that sensor data. Control engine 120 is described in greater detail below in conjunction with FIG. 2.

Figure 2:
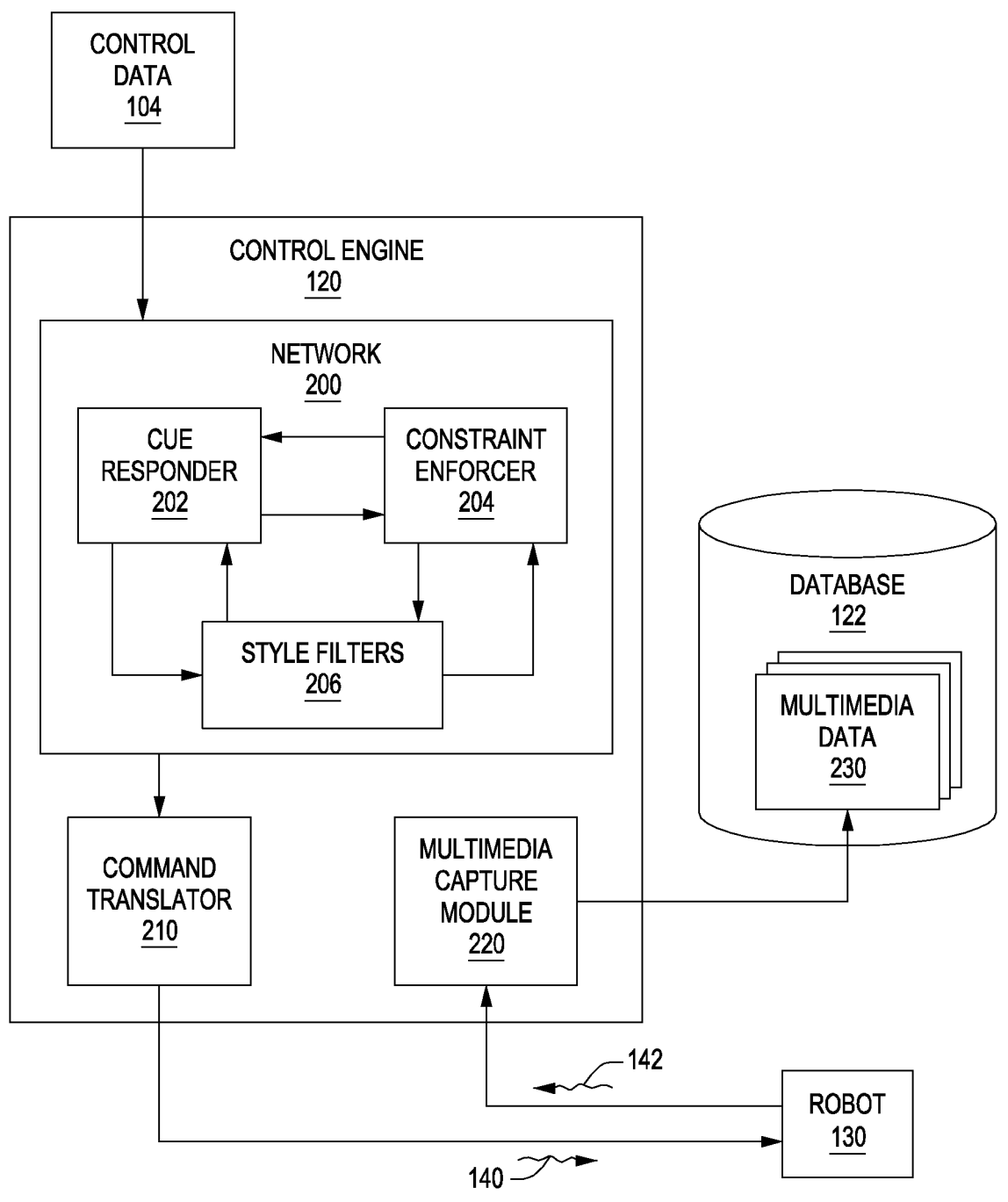
FIG. 2 is a more detailed illustration of the control engine of FIG. 1, according to various embodiments of the present invention.

FIG. 2 is a more detailed illustration of the control engine of FIG. 1, according to various embodiments of the present invention. As shown, control engine 120 includes network 200, command translator 210, and multimedia capture module 220.

Network 200 may be any technically feasible artificial neural network or collection thereof. For example, network 200 could include a recurrent neural network, a deep neural network, or a collection of multiple different artificial neural networks, among other possibilities. In one embodiment, network 200 includes individual submodules configured to perform specific tasks. In FIG. 2, network 200 includes three such submodules, a cue responder 202, a constraint enforcer 204, and style filters 206.

Cue responder 202 is a portion of network 200 that can be trained to identify certain cues that may occur in action being filmed. Persons familiar with film direction will understand that a "cue" generally refers to an identifiable signal upon which some action may occur. Constraint enforcer 204 is a portion of network 200 that can be trained to enforce specific constraints during filming. In the context of this disclosure a "constraint" refers to any limitation or restriction. Style filters 206 represent a portion of network 200 that can be trained to adjust the style with which filming occurs. As referred to herein, a "style" is a particular set of cinematographic techniques implemented to capture a film sequence. Generally, these submodules interoperate to generate commands that are provided to translator 210.

Translator 210 is configured to receive commands from network 200 and to then translate those commands into control signals 140 for controlling the dynamics of robot 130. In doing so, translator 210 may generate individual control signals for each actuator 132. In response to control signals 140, actuators 132 within robot 130 actuate and move sensor array 134 (and potentially robot 130 as a whole).

Sensor array 134 captures sensor data 142 and transmits this data to multimedia capture module 220 within control engine 120. Multimedia capture application 220 generally manages the operation of sensor array 134 and processes incoming sensor signals such as sensor signals 142. Based on these signals, multimedia capture module 220 generates multimedia data 230 for storage in database 122. Multimedia data 230 may include any technically feasible type of data, although in practice multimedia data 230 includes frames of video captured by sensor array 134, and possibly frames of audio data as well.

Figure 3:
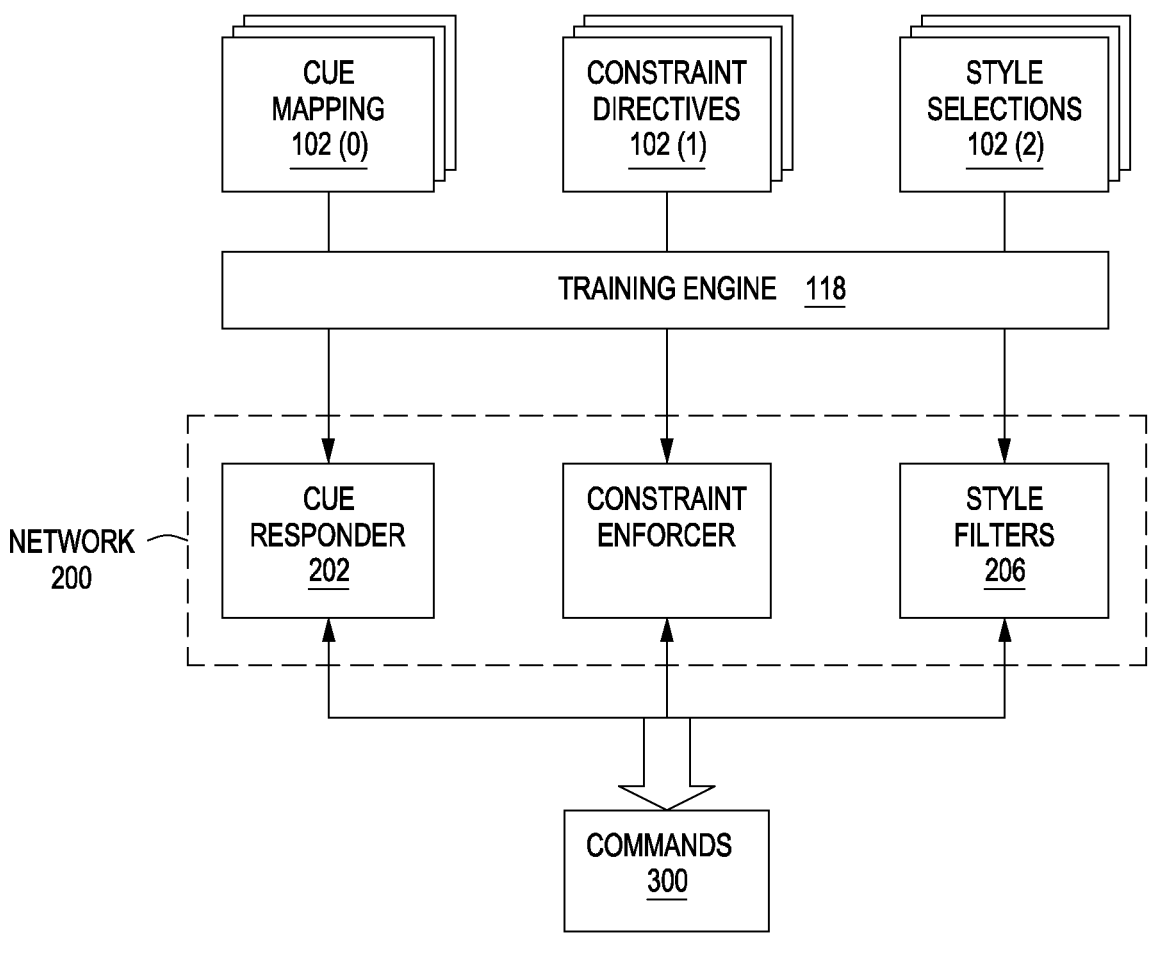
FIG. 3 illustrates how the network of FIG. 2 is trained to generate commands for controlling the robot of FIG. 1, according to various embodiments of the present invention.

FIG. 3 illustrates how the network of FIG. 2 is trained to generate commands for controlling the robot of FIG. 1, according to various embodiments of the present invention. As shown, cue responder 202, constraint enforcer 204, and style filters 206 receive different types of training data 102. Once trained via training engine 118, these submodules interoperate to collectively generate commands 300.

Training engine 118 trains cue responder 200 based on cue mapping 102(0). Cue mapping 102(0) includes a mapping between identifiable cues and cinematographic operations to be performed in response to those cues during filming. For example, cue mapping 102(0) could indicate that when an actor walks into the scene, robot 130 should change the camera angle to focus on that actor. A related example is described below in conjunction with FIGS. 4A-4B. Cue responder 200 may be trained, based on training data 102, to perform particular operations in response to a wide variety of cues, and then instructed, via control data 104, regarding which cues should be identified and responded to for a given scene.

Training engine 118 trains constraint enforcer 204 based on constraint directives 102(1). Constraint directives 102(1)

include a set of constraints that should be enforced during filming. For example, constraint directives 102(1) could indicate that robot should always keep an actor in frame 136. A related example is described in greater detail below in conjunction with FIGS. 5A-5B. Constraint enforcer 204 may be trained, via training data 102, to enforce a wide variety of different constraints, and then instructed, via control data 104, which subset of constraints should be enforced for a given scene.

Training engine 118 trains style filters 206 based on style selections 102(2). Style selections 102(2) include a set of characteristic styles that should be applied during filming. For example, style selections 102(2) could indicate a characteristic camera motion to employ when shooting a given scene. A related example is described in greater detail below in conjunction with FIGS. 6A-6B. Style filters 206 may be trained, via training data 102, to mimic a wide variety of different cinematographic styles associated with many different directors and/or movies, and then instructed, via control data 104, which characteristic style to implement for a given scene.

Based on the different types of training data 102 discussed above, cue responder 202, constrains enforcer 204, and style filters 206 interoperate to generate commands 300. Commands 300 may include commands for responding to specific cues while enforcing certain constraints and applying one or more characteristics styles. As discussed, command translator 210 translates these commands into control signals 140 for controlling robot 130.

Referring generally to FIGS. 1-3, the techniques describe herein can be applied to cause robot 130 to assist a director with filming a movie. By configuring control data 104, the director can instruct control engine 120 to perform any of a wide variety of different tasks that control engine 120 has previously been trained to perform. Thus, robot 130 may film a movie in a manner that is consistent with a desired cinematographic style. Several examples of this functionality are described in greater detail below in conjunction with FIGS. 4A-6B.

Exemplary Filming Operations Performed by a Robotic Camera

Figure 4A:
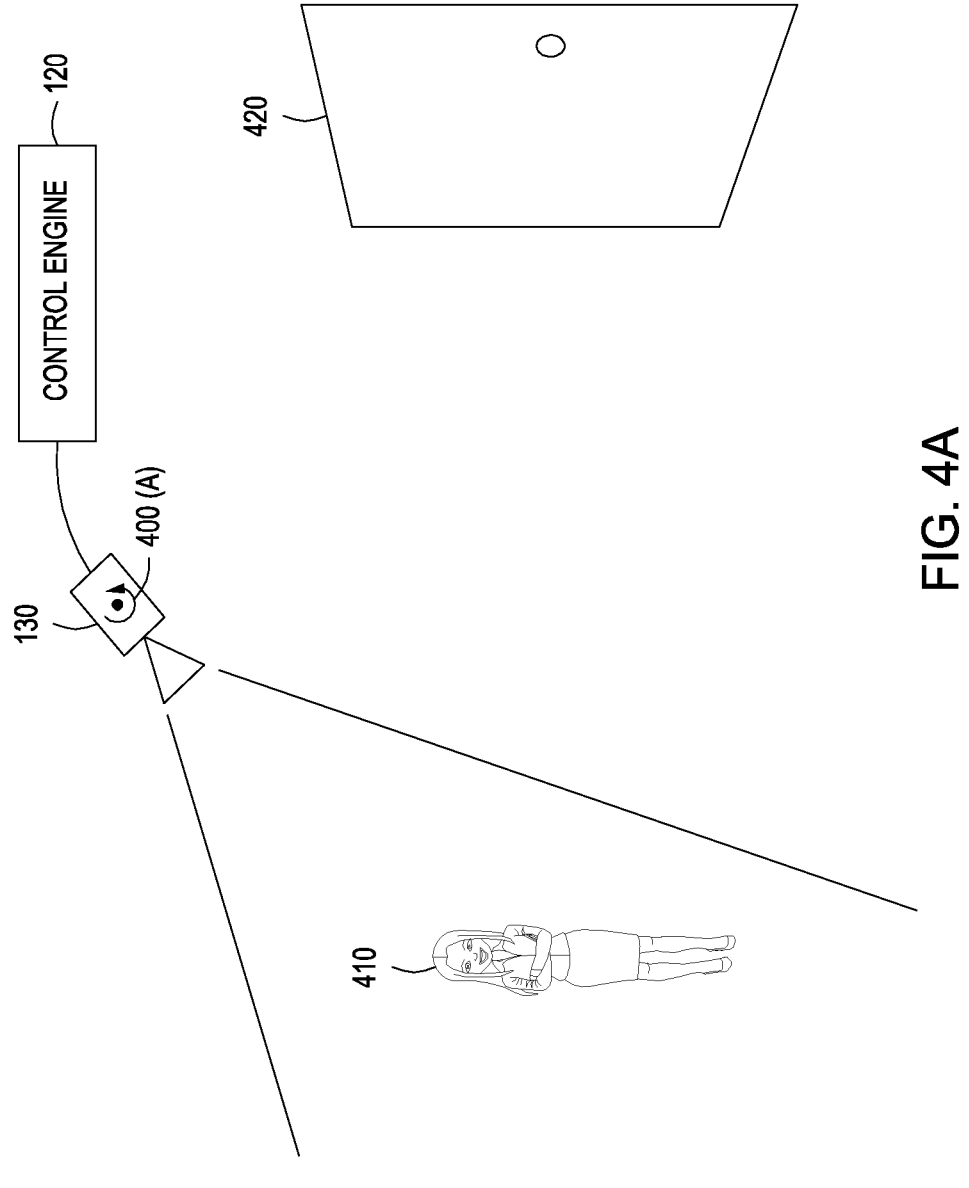
FIGS. 4A-4B illustrates how the control engine of FIG. 1 responds to a cue during filming, according to various embodiments of the present invention.
Figure 4B:
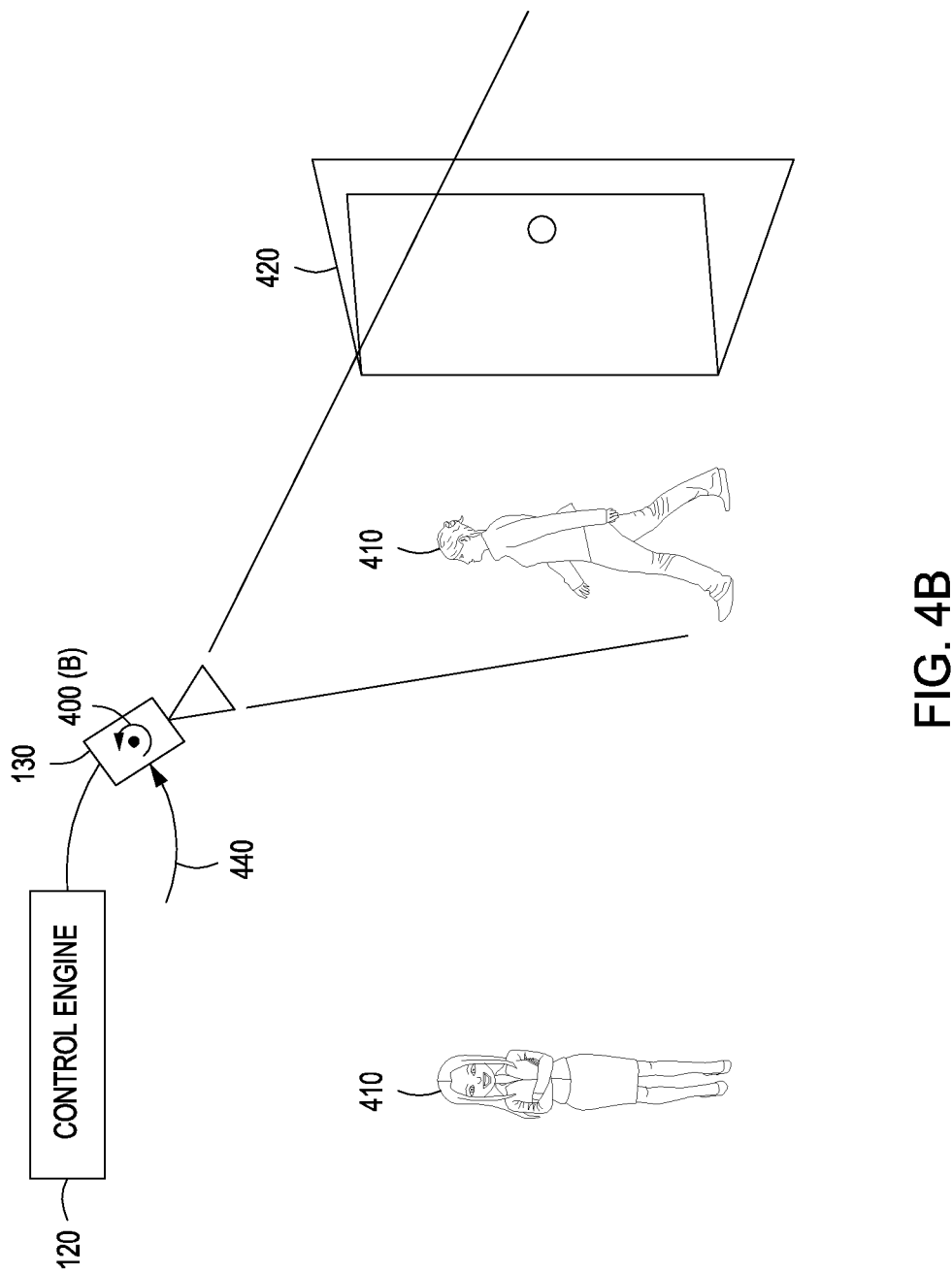

FIGS. 4A-4B illustrates how the control engine of FIG. 1 responds to a cue during filming, according to various embodiments of the present invention. As shown in FIG. 4A, robot 130 is disposed with configuration 400(A). Configuration 400(A) generally indicates a specific position in three-dimensional space and a particular orientation within that space. In configuration 400(A), robot 130 captures frames of video data focused on subject 410. Subject 410 is shown as a human actor, although subject 410 may be any technically feasible object, region, direction, or entity towards which robot 130 may be directed to capture video frames.

In the example discussed herein, control engine 120 has been previously trained, via training data 102, to respond to a variety of different cues. In addition, control engine 120 has been instructed, via control data 104, to identify and respond to the specific cue of a subject entering the scene via door 420.

As shown in FIG. 4B, a subject 430 enters the scene via door 420. Control engine 120 identifies the entrance of subject 430, and, in response to this cue, reconfigures robot 130 from configuration 400(A) to configuration 400(B). In configuration 400(B), robot is directed towards subject 430 and captures video frames focused on subject 410. Like subject 400, subject 410 is shown as a human actor but may be any technically feasible entity.

Referring generally to FIGS. 4A-4B, these figures exemplify how control engine 120 causes robot 130 to respond to cues by performing camera reconfigurations. In practice, control engine 120 may analyze sensor data 142 and perform any technically feasible form of processing, including applying computer vision techniques or other machine learning-based approaches, to detect cues. In addition, control engine 120 may be trained to identify and respond to any cues present in training data 102 without specific instructions set forth in control data 104. With this technique, a director may simply provide control engine 120 with exemplary film sequences and training engine 118 may train control engine 120 to copy the cue responses present in those exemplary sequences.

Figure 5A:
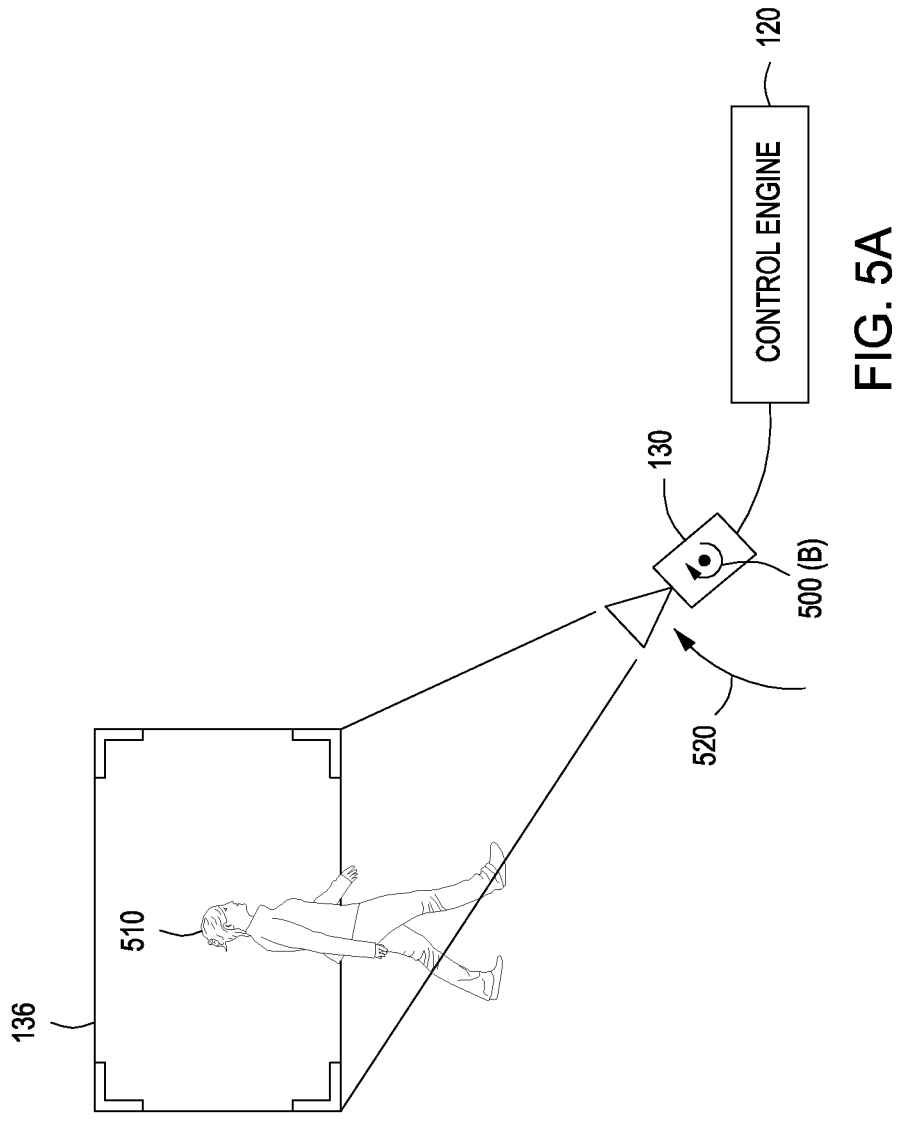
FIGS. 5A-5B illustrates how the control engine of FIG. 1 enforces a constraint during filming, according to various embodiments of the present invention.
Figure 5B:
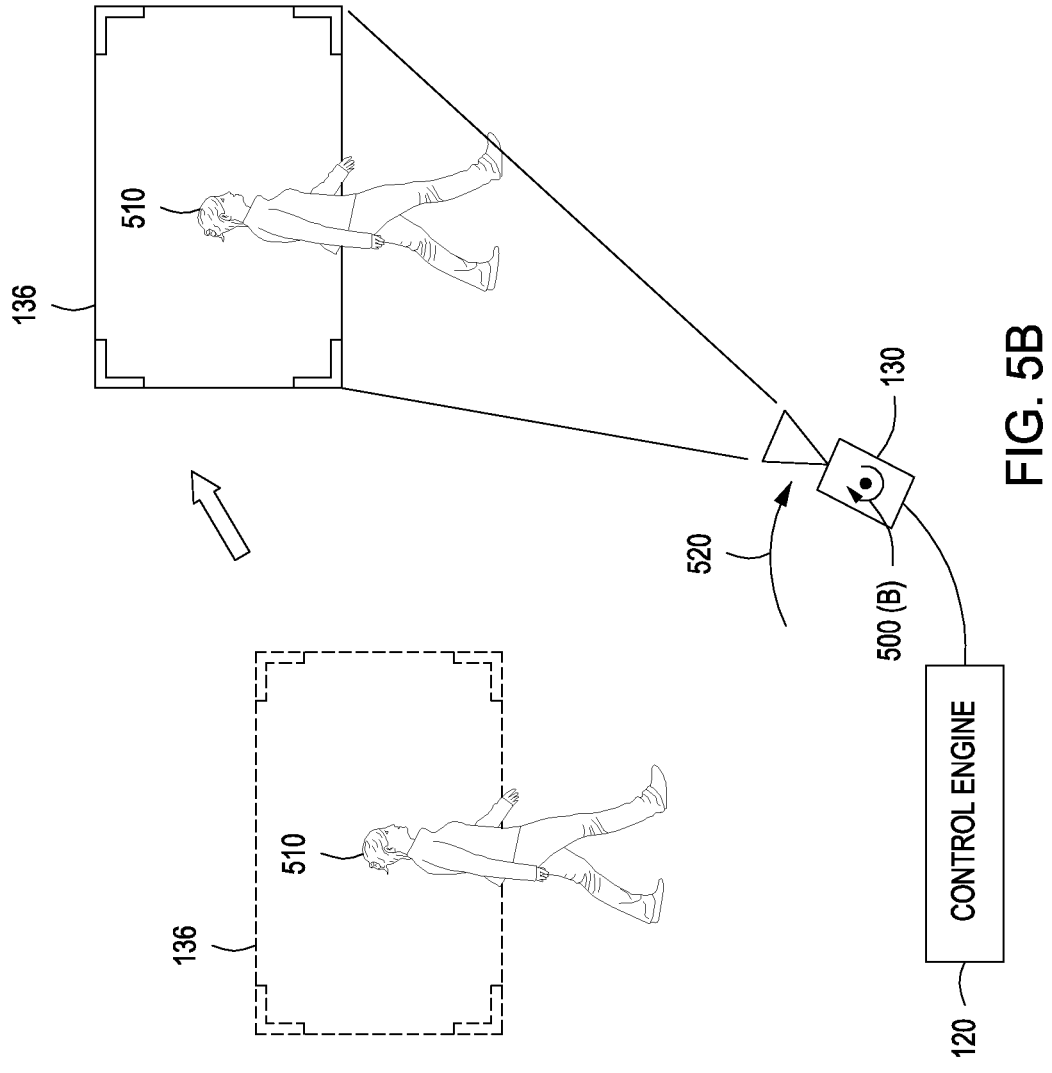

FIGS. 5A-5B illustrates how the control engine of FIG. 1 enforces a constraint during filming, according to various embodiments of the present invention. As shown in FIG. 5A, robot 130 occupies configuration 500(A) and captures frames 136 of subject 510. In this example, subject 510 is a human actor walking from left to right. Control engine 120 may be trained, via training data 102, to enforce a variety of different constraints. In addition, control engine 120 may be instructed, via control data 104, to enforce the specific constraint of keeping subject 510 within frames 136. As shown in FIG. 5B, when subject 510 walks from left to right, control engine 120 reconfigures robot 130 from configuration 500(A) to configuration 500(B), effectively reorienting robot 130 by angle 520.

Referring generally to FIGS. 5A-5B, these figures illustrate how control engine 120 causes robot 130 to enforce constraints by performing camera reconfigurations. In practice, control engine 120 may analyze sensor data 142 and perform any technically feasible form of processing, including applying computer vision techniques or other machine learning-based approaches, to identify when constraints are potentially violated and take corrective action in response. In addition, control engine 120 may generally be trained to enforce constraints included in training data 102, without specific instructions set forth in control data 104. Accordingly, a director may provide control engine 120 with exemplary film sequences and training engine 118 may then train control engine 120 to copy the constraints present in those exemplary sequences without needing further instruction.

Figure 6A:
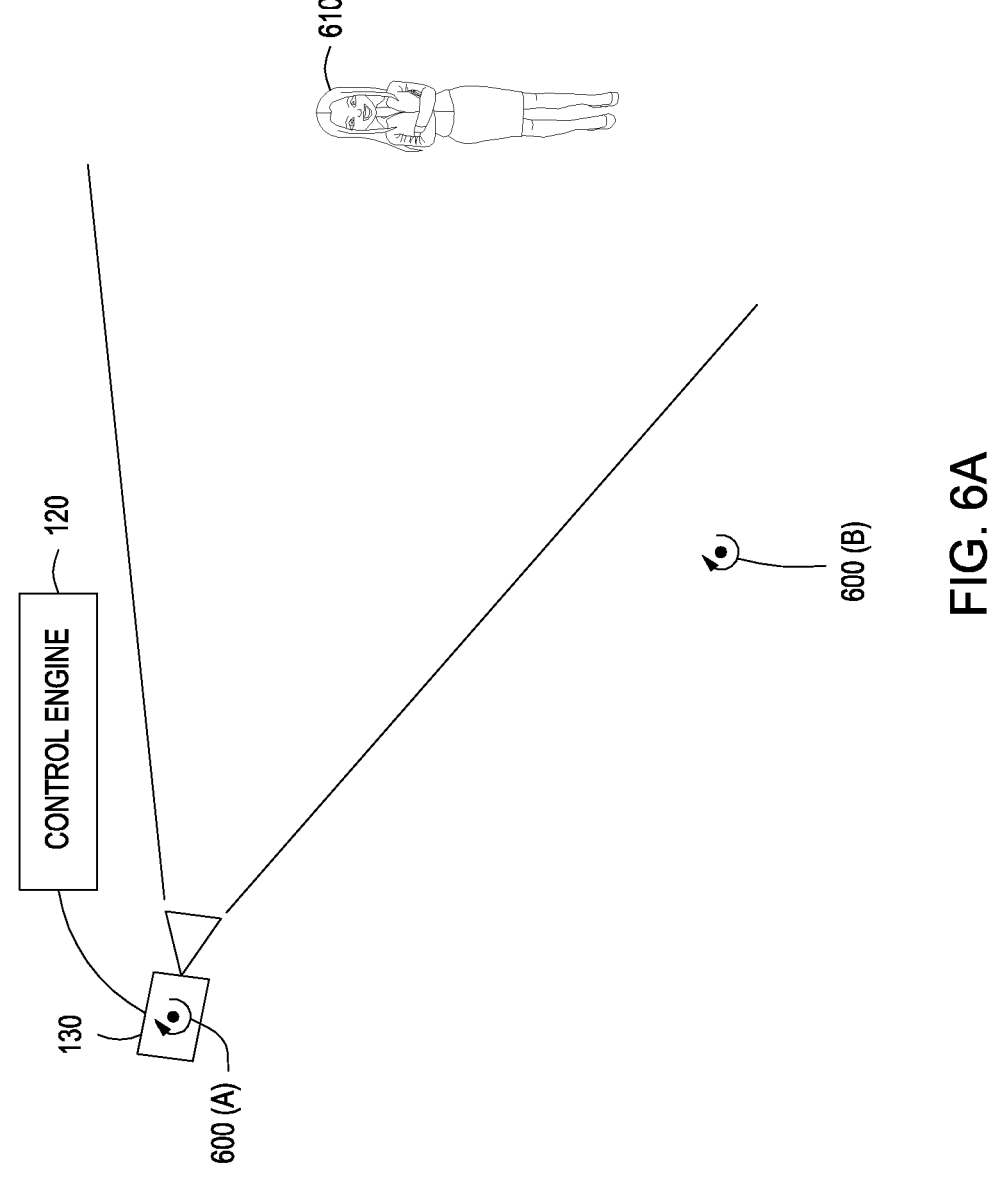
FIGS. 6A-6B illustrates how the control engine of FIG. 1 applies a style during filming, according to various embodiments of the present invention.
Figure 6B:
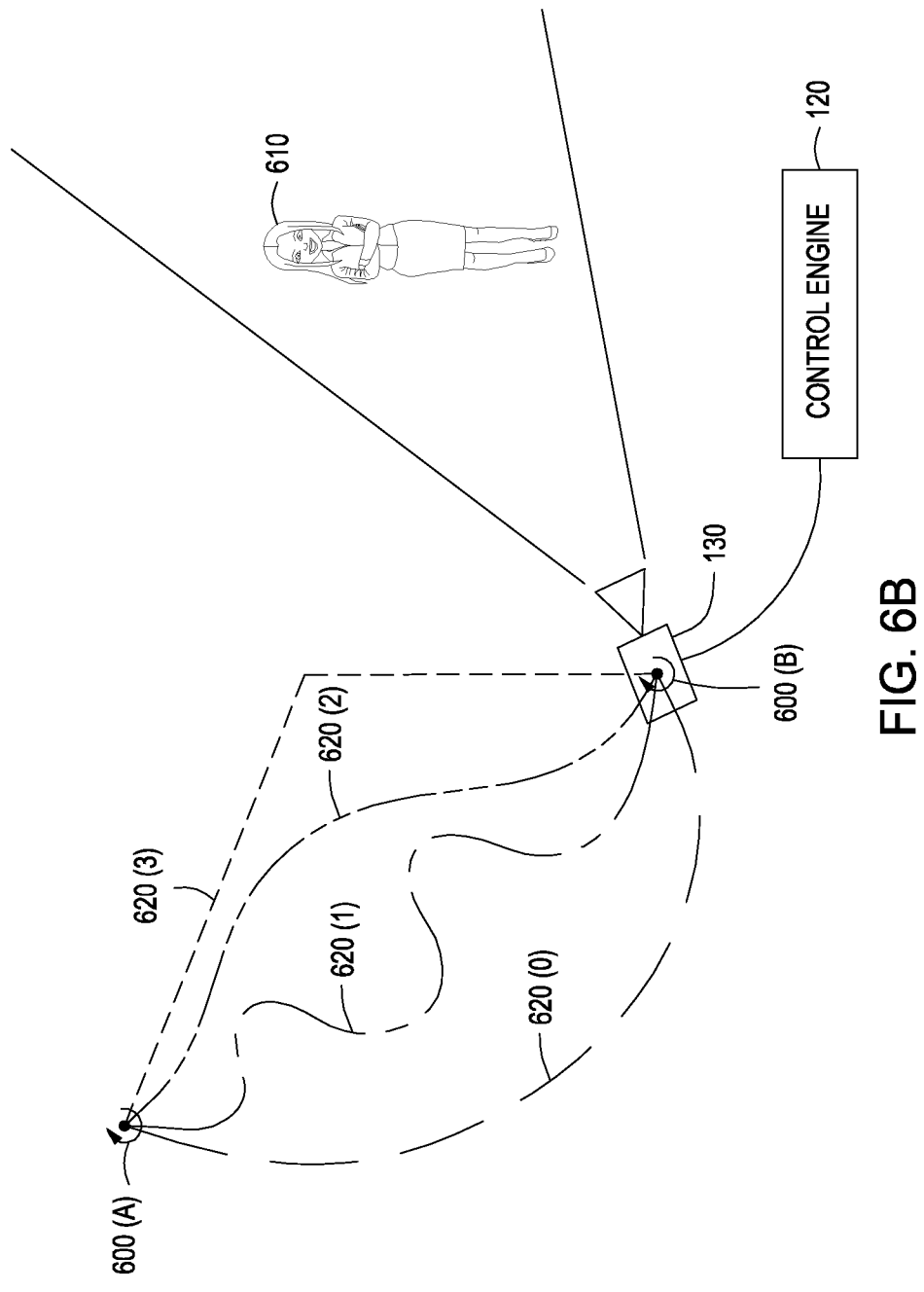

FIGS. 6A-6B illustrates how the control engine of FIG. 1 applies a style during filming, according to various embodiments of the present invention. As shown in FIG. 6A, robot 130 is disposed according to configuration 600(A) and, in so doing, captures video frames associated with subject 610. During the scene being filmed, control engine 120 moves robot 130 to reside in configuration 600(B). Control engine 120 may apply one or more characteristic styles during that reconfiguration.

As shown in FIG. 6B, control engine 120 may cause robot 130 to travel along any of trajectories 620(0) through 620(3) from configuration 600(A) to configuration 600(B). Each trajectory 620 may be derived from the characteristic style of a different director or cinematographer. Alternatively, each trajectory 620 could represent a filming style associated with a particular type of movie. For example, one trajectory 620 could represent a "documentary" style of filming, while another could represent an "action" style of filming.

Referring generally to FIGS. 6A-6B, control engine 120 may implement a wide variety of operations during filming in order to apply a characteristic style associated with one or more directors or movie types. Persons skilled in the art will understand that any given characteristic style may have specific attributes that control engine 120 can be trained to mimic. These attributes may relate to specific camera-related operations, such as zooming, panning, and so forth, or broader operations such as framing shots, changing camera angles, changing between multiple different cameras, and so forth. Control engine 120 is configured to operate in this manner upon being trained based on training data 102, as discussed, and may also receive control data 104 indicating the specific styles to be applied for a given scene.

Referring generally to FIGS. 4A-6B, the examples discussed herein are provided to illustrate how control engine 120 controls robot 130 during filming of a movie. Any of the techniques discussed herein may be combined in any technically feasible fashion. For example, control engine 120 may be configured to respond to certain cues while also applying a particular characteristic style. Various procedures implemented by training engine 118 and control engine 120, respectively, are described in greater detail below in conjunction with FIGS. 7-8.

Figure 7:
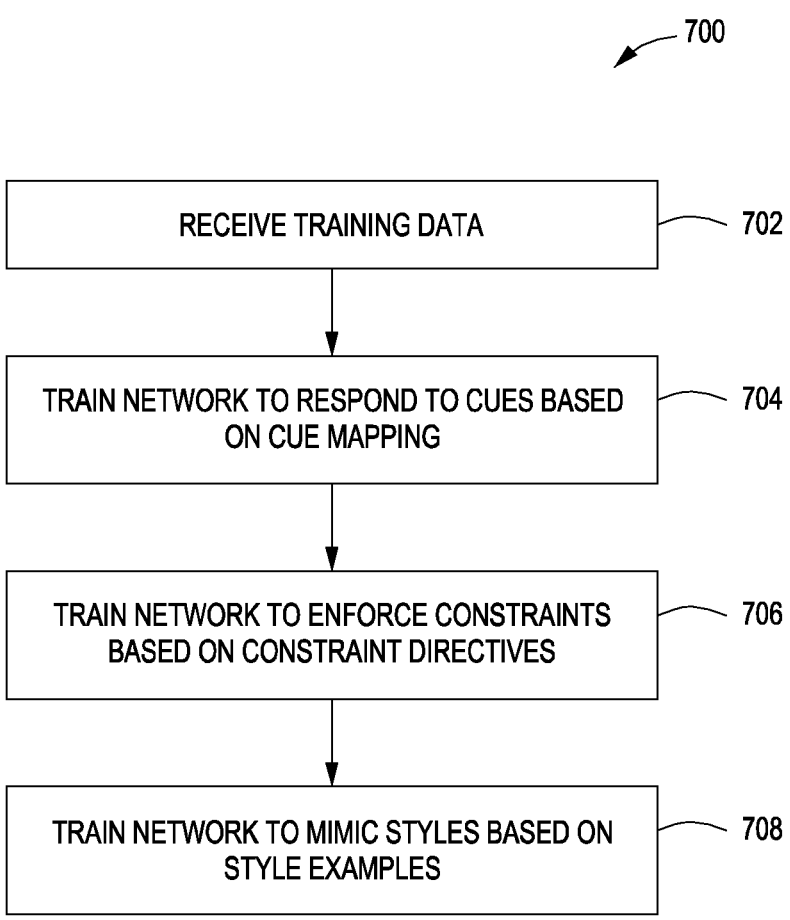
FIG. 7 is a flow diagram of method steps for training a network to control a robotic camera, according to various embodiments of the present invention.

Procedures for Training and Instructing a Network to Operate a Robotic Camera FIG. 7 is a flow diagram of method steps for training a network to control a robotic camera, according to various embodiments of the present invention. Although the method steps are described in conjunction with the systems of FIGS. 1-6B, persons skilled in the art will understand that any system configured to perform the method steps, in any order, is within the scope of the present invention.

As shown, a method 700 begins at step 702, where training engine 118 receives training data 102. Training data 102 may include movies, movie sequences, frames of video tagged with metadata, camera position information corresponding to movie sequences, and generally any technically feasible form of cinematographic data that exemplifies how a sequence of frames is captured.

At step 704, training engine 118 trains network 200 to respond to cues based on cue mapping 102(0). Cue mapping 102(0), discussed above in conjunction with FIG. 3, includes a mapping between cues and specific operations that robot 130 should perform in response to those cues. Training engine 118 may also train network 200 based on examples of how cinematographic operations can be performed in response to various cues.

At step 706, training engine 118 trains network 200 to enforce constraints based on constraint directives 102(1). Constraint directives 102(1), discussed above in conjunction with FIG. 3, include a set of constraints that should be enforced during filming. Training engine 118 may also train network 200 based on examples of how cinematographic operations can be performed to enforce different constraints.

At step 708, training engine 118 trains network 200 to mimic certain characteristics styles based on style examples 102(2). Style examples 102(1), discussed above in conjunction with FIG. 3, represent example of film sequences generated according to a particular style. Training engine 118 trains network 200 at step 708 to generate commands that may cause robot 130 to capture video data according to one or more of those styles.

Training engine 118 may execute the method 700 to train network 200 within control engine 120 via any technically feasible approach, including machine learning, artificial intelligence, reinforcement learning, backpropagation, and so forth. Once trained, control engine 120 controls robot 130 to capture multimedia content, as described below in conjunction with FIG. 8.

Figure 8:
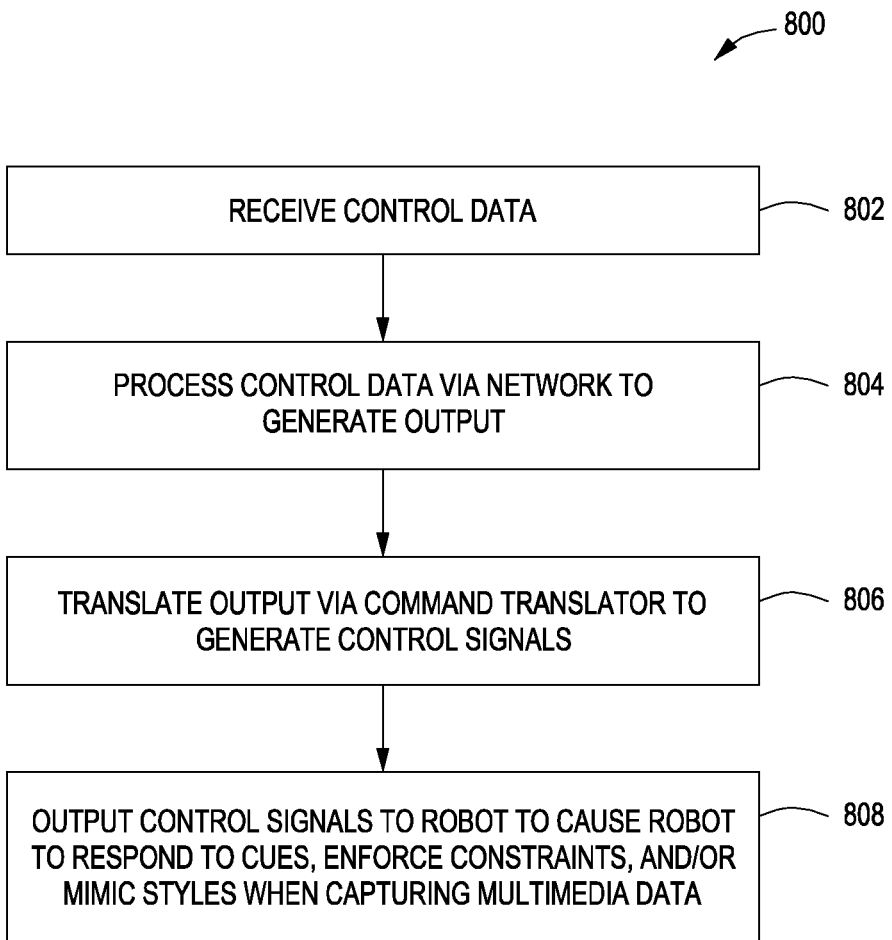
FIG. 8 is a flow diagram of method steps for controlling a robotic camera to capture multimedia content, according to various embodiments of the present invention.

FIG. 8 is a flow diagram of method steps for controlling a robotic camera to capture multimedia data, according to various embodiments of the present invention. Although the method steps are described in conjunction with the systems of FIGS. 1-6B, persons skilled in the art will understand that any system configured to perform the method steps, in any order, is within the scope of the present invention.

As shown, a method 800 begins at step 802, where control engine 120 receives control data 104. Control data 104 may indicate specific cues that control engine 120 should respond to during filming. Control engine 120 may be trained to respond to a wide variety of cues via the method 700 discussed above in conjunction with FIG. 7, and then instructed to respond to a specific subset of those cues via control data 104. Control data 104 may also indicate particular constraints that control engine 120 should enforce during filming. Control engine 120 may be trained to enforce a wide variety of constraints via the method 700, and then instructed to enforce a given subset of those constraints based on control data 104. Control data 104 may also indicate one or more characteristic styles that should be applied during filming. Control engine 120 may be trained to apply many characteristics styles via the method 700, including those associated with specific directors or movie styles, and then instructed to apply one or more specific styles based on control data 104.

At step 804, control engine 120 processes control data 104 via network 200 in order to generate commands for output to command translator 210. At step 806, command translator 210 translates the output of network 200 to generate specific control signals for causing robot 130 to change configuration. At step 808, control engine 120 outputs control signals 140 to robot 130 to cause robot 130 to respond to cues, enforce constraints, and/or mimic characteristics styles when capturing multimedia data via sensor array 134.

In sum, a control engine is trained to operate a robotic camera according to a variety of different cinematographic techniques. The control engine may reconfigure the robotic camera to respond to a set of cues, to enforce a set of constraints, or to apply one or more characteristic styles. A training engine trains a network within the control engine based on training data that exemplifies cue responses, enforced constraints, and characteristic styles.

At least one advantage of the techniques described herein is that a director of a movie can provide examples of cinematographic operations, and the control engine then causes the robot to mimic those operations. Accordingly, the director is afforded a greater ability to communicate how a movie should be filmed. Because the director need not communicate with a human camera operator, communication difficulties can be avoided. Further, because the control engine operates based on specific training data, the precision with which the control engine operates the robot can be adjusted.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical funct-ion(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for controlling a physical robot, the method comprising:
   receiving, by a processor executing a trained neural network in response to a user input, a first input comprising control data that selects, from a plurality of different characteristic styles for filming a scene that have different attributes related to performing a zoom-ing operation, a first characteristic style for filming the scene having one or more first attributes related to performing the zooming operation, wherein the first characteristic style is executed when capturing sensor data;
   generating, by the trained neural a network, a set of commands based on the first characteristic style, wherein the trained neural network is trained based on training data that includes a plurality of scenes filmed by a plurality of users performing at least one zooming operation according to the plurality of different char-acteristic styles; and
   causing a physical robot to execute the set of commands to perform one or more movements to film the scene according to the first characteristic style for filming the scene having the one or more first attributes related to performing the zooming operation when capturing the sensor data.

2. The computer-implemented method of claim 1, wherein the trained neural network is trained to generate the set of commands based on the training data associated with an exemplary robotic camera capturing exemplary sensor data.

3. The computer-implemented method of claim 1, further comprising translating the set of commands into control signals for controlling one or more operations of the physi-cal robot.

4. The computer-implemented method of claim 1, wherein causing the physical robot to execute the set of commands to perform the one or more movements to film the scene according to the first characteristic style further includes:
   processing the sensor data to identify a first cue; and
   configuring the physical robot in response to the first cue.

5. The computer-implemented method of claim 1, wherein causing the physical robot to execute the set of commands to perform the one or more movements to film the scene according to the first characteristic style further includes:
   processing the sensor data to identify a first constraint to enforce; and
   configuring the physical robot to enforce the first con-straint.

6. The computer-implemented method of claim 1, further comprising causing the physical robot to execute the set of commands to perform the one or more movements to film the scene according to the first characteristic style by adjust-ing a characteristic style with which the physical robot captures the sensor data based on an exemplary character-istic style.

7. The computer-implemented method of claim 1, further comprising converting the captured sensor data into multimedia data that comprises a sequence of video frames and a sequence of audio frames.

8. The computer-implemented method of claim 1, wherein the trained neural configured network comprises an artificial neural network trained via a machine learning algorithm.

9. The computer-implemented method of claim 1, wherein the plurality of different characteristic styles correspond to different cinematographic operations having different attributes for performing the zooming operation.

10. The computer-implemented method of claim 1, further comprising training a neural network to generate the trained neural network using the training data that includes the plurality of scenes filmed by the plurality of users performing the at least one zooming operation according to the plurality of different characteristic styles.

11. One or more non-transitory computer-readable media that, when executed by one or more processors, cause the one or more processors to control a physical robot by performing the steps of:

receiving, by a first processor executing a trained neural network in response to a user input, a first input comprising control data that selects, from a plurality of different characteristic styles for filming a scene that have different attributes related to performing a zooming operation, a first characteristic style for filming the scene having one or more first attributes related to performing the zooming operation, wherein the first characteristic style is executed when capturing sensor data;

generating, by the trained neural network, a set of commands based on the first characteristic style, wherein the trained neural network is trained based on training data that includes a plurality of scenes filmed by a plurality of users performing at least one zooming operation according to the plurality of different characteristic styles; and causing the physical robot to execute the set of commands to perform one or more movements to film the scene according to the first characteristic style for filming the scene having the one or more first attributes related to performing the zooming operation when capturing the sensor data.

12. The one or more non-transitory computer-readable media of claim 11, wherein the trained neural network is trained to generate the set of commands based on the training data.

13. The one or more non-transitory computer-readable media of claim 12, wherein the training data indicates a mapping between a set of cues and corresponding cinematographic operations to be performed by the physical robot in response to the set of cues.

14. The one or more non-transitory computer-readable media of claim 12, wherein the training data indicates one or more constraints that prevent the physical robot from performing a set of cinematographic operations under a corresponding set of conditions.

15. The one or more non-transitory computer-readable media of claim 12, wherein the training data indicates a set of style selections that influence performing the zooming operation by the physical robot.

16. The one or more non-transitory computer-readable media of claim 11, wherein causing the physical robot to execute the set of commands to perform the one or more movements to film the scene according to the first characteristic style further includes:

processing the sensor data to identify a first cue; and
configuring the physical robot in response to the first cue.

17. The one or more non-transitory computer-readable media of claim 11, wherein causing the physical robot to execute the set of commands to perform the one or more movements to film the scene according to the first characteristic style further includes:

processing the sensor data to identify a first constraint to enforce; and
configuring the physical robot to enforce the first constraint.

18. The one or more non-transitory computer-readable media of claim 11, further comprising causing the physical robot to execute the set of commands to perform the one or more movements to film the scene according to the first characteristic style by adjusting a characteristic style with which the physical robot captures the sensor data based on an exemplary characteristic style.

19. The one or more non-transitory computer-readable media of claim 11, wherein the first characteristic style for filming the scene having the one or more first attributes related to performing the zooming operation comprises a sequence of cinematographic operations.

20. A system for controlling a physical robot, comprising:
one or more memories storing a control engine; and
one or more processors configured to:

receive, by a first processor executing a trained neural network in response to a user input, a first input comprising control data that selects, from a plurality of different characteristic styles for filming a scene that have different attributes related to performing a zooming operation, a first characteristic style for filming the scene having one or more first attributes related to performing the zooming operation, wherein the first characteristic style is executed when capturing sensor data generate, by the trained neural network, a set of commands based on the first characteristic style, wherein the trained neural network is trained based on training data that includes a plurality of scenes filmed by a plurality of users performing at least one zooming operation according to the plurality of different characteristic styles; and cause the physical robot to execute the set of commands to perform one or more movements to film the scene according to the first characteristic style for filming the scene having the one or more first attributes related to performing the zooming operation when capturing the sensor data.

21. The system of claim 20, wherein the one or more processors, when executing the control engine, are configured to:

receive the first input;
generate the set of commands; and
cause the physical robot to execute the set of commands to perform the one or more movements to film the scene according to the first characteristic style.

* * * * *